United States Patent
Kang (10) Patent No.: US 10,204,023 B2
(45) Date of Patent: Feb. 12, 2019

(54) DISPLAY DEVICE AND METHOD OF MEASURING CONTACT RESISTANCE THEREOF

(71) Applicant: LG DISPLAY CO., LTD., Seoul (KR)

(72) Inventor: Jeongho Kang, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 26 days.

(21) Appl. No.: 15/265,641

(22) Filed: Sep. 14, 2016

(65) Prior Publication Data

US 2017/0083133 A1   Mar. 23, 2017

(30) Foreign Application Priority Data

Sep. 17, 2015  (KR) .................. 10-2015-0131843

(51) Int. Cl.
| | | |
|---|---|---|
| *G06F 3/045* | (2006.01) | |
| *G06F 11/22* | (2006.01) | |
| *G02F 1/133* | (2006.01) | |
| *G02F 1/13* | (2006.01) | |
| *G02F 1/1345* | (2006.01) | |

(52) U.S. Cl.
CPC .......... *G06F 11/2221* (2013.01); *G02F 1/133* (2013.01); *G02F 1/1309* (2013.01); *G02F 1/13454* (2013.01); *G02F 1/13306* (2013.01); *G02F 1/13458* (2013.01)

(58) Field of Classification Search
CPC .... G02F 1/1309; G02F 1/133; G02F 1/13306; G02F 1/13454; G02F 1/13458; G06F 11/2221
See application file for complete search history.

(56) References Cited

U.S. PATENT DOCUMENTS

| 7,898,518 B2 | 3/2011 | Hong et al. | |
|---|---|---|---|
| 7,948,465 B2 | 5/2011 | Cho et al. | |
| 8,330,699 B2 | 12/2012 | Hong et al. | |
| 2005/0253831 A1* | 11/2005 | Yamada | G09G 3/20 345/204 |
| 2012/0105085 A1* | 5/2012 | Chen | G02F 1/1309 324/693 |
| 2014/0187088 A1* | 7/2014 | Kim | G02F 1/1309 439/620.01 |
| 2015/0029096 A1* | 1/2015 | Ishihara | H04N 5/63 345/156 |

* cited by examiner

*Primary Examiner* — Insa Sadio
(74) *Attorney, Agent, or Firm* — Seed IP Law Group LLP (57) ABSTRACT

Provided are a display device and a method for measuring contact resistance thereof. A plurality of dummy bumps disposed on a driving circuit or a flexible circuit board are connected to shorting pads disposed on the display panel, and bonding resistance is measured by comparing an input voltage of a comparator input through bonding resistance between dummy bumps and shorting pads with a variable reference voltage.

12 Claims, 7 Drawing Sheets

| C1, C2 | SW1 | SW2 | SW3 | SW4 |
|---|---|---|---|---|
| LL | ON | OFF | OFF | OFF |
| LH | OFF | ON | OFF | OFF |
| HL | OFF | OFF | ON | OFF |
| HH | OFF | OFF | OFF | ON |

FIG. 6

| 1 ~ 96 | 97 ~ 192 | 193 ~ 288 | 289 ~ 384 | 385 ~ 720 | 721 ~ 1068 | 1069 ~ 1164 | 1165 ~ 1260 | 1261 ~ 1356 | 1357 ~ 1452 |
|---|---|---|---|---|---|---|---|---|---|

1-Group 2-Group 3-Group 4-Group                    4-Group 3-Group 2-Group 1-Group C1, C2=LL, $R_{bonding} > 10\Omega$

| 1 ~ 96 | 97 ~ 192 | 193 ~ 288 | 289 ~ 384 | 385 ~ 720 | 721 ~ 1068 | 1069 ~ 1164 | 1165 ~ 1260 | 1261 ~ 1356 | 1357 ~ 1452 |
|---|---|---|---|---|---|---|---|---|---|

C1, C2=LH, $R_{bonding} > 100\Omega$

| 1 ~ 96 | 97 ~ 192 | 193 ~ 288 | 289 ~ 384 | 385 ~ 720 | 721 ~ 1068 | 1069 ~ 1164 | 1165 ~ 1260 | 1261 ~ 1356 | 1357 ~ 1452 |
|---|---|---|---|---|---|---|---|---|---|

C1, C2=HL, $R_{bonding} > 1K\Omega$

| 1 ~ 96 | 97 ~ 192 | 193 ~ 288 | 289 ~ 384 | 385 ~ 720 | 721 ~ 1068 | 1069 ~ 1164 | 1165 ~ 1260 | 1261 ~ 1356 | 1357 ~ 1452 |
|---|---|---|---|---|---|---|---|---|---|

C1, C2=HH, $R_{bonding} > 10K\Omega$

| 1 ~ 96 | 97 ~ 192 | 193 ~ 288 | 289 ~ 384 | 385 ~ 720 | 721 ~ 1068 | 1069 ~ 1164 | 1165 ~ 1260 | 1261 ~ 1356 | 1357 ~ 1452 |
|---|---|---|---|---|---|---|---|---|---|

DISPLAY DEVICE AND METHOD OF MEASURING CONTACT RESISTANCE THEREOF

This application claims the benefit of Korean Patent Application No. 10-2015-0131843 filed on Sep. 17, 2015, the entire contents of which is incorporated herein by reference for all purposes as if fully set forth herein.

BACKGROUND OF THE INVENTION

Field of the Invention

The present disclosure relates to a display device and a method for measuring contact resistance thereof.

Discussion of the Related Art

Various flat panel display devices such as a liquid crystal display (LCD), an organic light emitting display device, a plasma display panel (PDP), an electrophoretic display (EPD), and the like, have been developed.

An LCD displays an image by controlling an electric field applied to liquid crystal molecules according to a data voltage. An active matrix type LCD has thin film transistors (TFTs) formed in every pixel.

A process of manufacturing an LCD includes a substrate cleaning process, a substrate patterning process, an alignment film forming/rubbing process, a substrate bonding and liquid crystal dropping process, a driving circuit mounting process, an inspection process, a repair processing, a liquid crystal assembly process, and the like.

During the substrate cleaning process, foreign materials contaminating surfaces of an upper glass substrate and a lower glass substrate of a display panel are removed with a cleaning solution. During the substrate patterning process, signal lines including a data line and a gate line, a thin film transistor (TFT), a pixel electrode, a common electrode, and the like, are formed on the lower glass substrate. Also, during the substrate patterning process, a black matrix, a color filter, and the like, are formed on the upper glass substrate. During the alignment film forming/rubbing process, an alignment film is coated on each of the glass substrates and rubbed with rubbing cloth or photo-aligned. Through the sequential processes, data lines to which a video data voltage is supplied, gate lines intersecting with the data lines, to which a scan signal, i.e., a gate pulse, is sequentially supplied, and a TFT array including TFTs formed at intersections of the data lines and the gate lines, pixel electrodes connected to the TFTs, a storage capacitor, and the like, are formed on the lower glass substrate. The common electrode is formed on the upper glass substrate in a vertical field driving mode such as a twisted nematic (TN) mode and a vertical alignment (VA) mode and formed on the lower glass substrate together with a pixel electrode in an in-plane field driving mode such as an in-plane switching (IPS) mode or a fringe field switching (FFS) mode. A polarizer is adhered to each of the upper glass substrate and the lower glass substrate.

During the substrate bonding and liquid dropping process, a sealant is drawn on any one of the upper and lower glass substrates of the display panel, liquid crystal is dropped, and thereafter, the upper glass substrate and the lower glass substrate are bonded with the sealant. A liquid crystal layer is defined as a liquid crystal region defined by the sealant.

During the driving circuit mounting process, a drive integrated circuit (IC) in which driving circuits are integrated is adhered to data pads of the display panel by an anisotropic conductive film (ACF) through a chip-on-glass (COG) bonding or a tape automated bonding (TAB) process.

A gate driving circuit may be directly formed on the lower glass substrate through a gate-in-panel (GIP) process or may be adhered to gate pads of the display panel by an ACF in a tape automated bonding (TAB) process during the driving circuit mounting process. Also, during the driving circuit mounting process, ICs and printed circuit board (PCB) are connected by a flexible circuit board such as a flexible printed circuit board (FPCB), a flexible flat cable (FFC), and the like.

The inspection process includes inspection of a driving circuit, inspection of a line such as a data line and a gate line formed on a TFT array substrate, inspection performed after formation of a pixel electrode, electrical inspection performed after the substrate bonding and liquid crystal dropping process, inspection of lighting, and the like. The inspection process may include a process (hereinafter, referred to as a "bonding resistance inspection method) of inspecting contact resistance between a drive IC and the substrates of the display panel in the COG bonding process. During the repair process, a defect discovered during the inspection process is repaired.

When the display panel is completed through the aforementioned sequential processes, a process of assembling a liquid crystal module is performed. During the process of assembling a liquid crystal module, a backlight unit is aligned below the display panel and the display panel and the backlight unit are assembled using a device such as a guide/case member, or the like.

Figure 1:
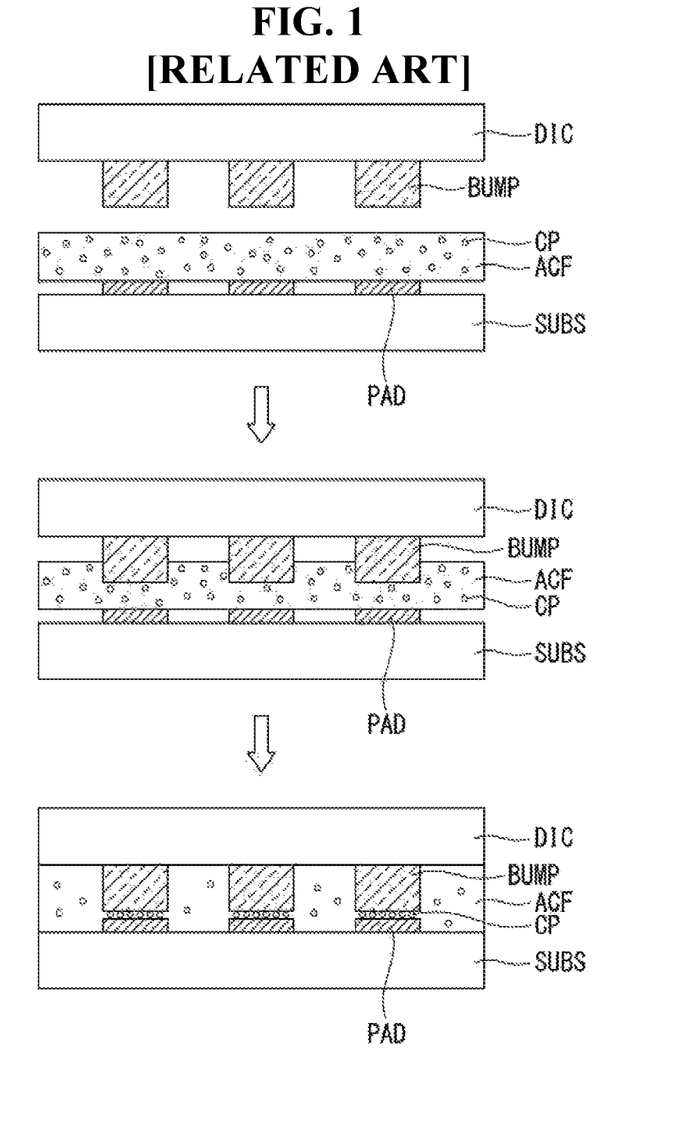
FIG. 1 is a view schematically illustrating a chip-on-glass (COG) bonding process.

During the COG bonding process, an ACF is aligned on a substrate SUBS, and a drive IC DIC is aligned above the ACF. Bumps BUMP of the drive IC DIC face pads PAD formed on the substrate SUBS with the ACF interposed therebetween. Thereafter, the substrate SUBS is heated and the drive IC DIC is pressed and heated such that the bumps BUMP of the drive IC DIC are adhered to the pads PAD on the substrate SUBS. Here, conductive particles CP of the ACF electrically connect the bumps BUMP of the drive IC DIC and the pads PAD of the substrate SUBS. The pads PAD are connected to signal lines formed on the substrate SUBS. The drive IC DIC outputs an output signal through the bumps BUMP, and the output signal is supplied to the signal lines of the substrate SUBS through the pads.

Contact resistance between the bumps BUMP of the drive IC DIC and the pads PAD of the substrate SUBS adhered during the COG bonding process is also known as bonding resistance. A bonding resistance inspection method is essentially performed during the COG bonding process. High contact resistance indicates a defect COG bonding process, and thus, the drive IC DIC should be removed and bonded again. In order to perform bonding resistance inspection method, a dummy pad for resistant measurement connected to the pads on the substrate SUBS is separately provided. The bonding resistance inspection method is performed as a manual measurement method in such a manner that an inspector directly connects a terminal of a measurement instrument to the dummy pad for resistance measurement to perform measurement.

SUMMARY OF THE INVENTION

The related art bonding resistance inspection method has the following problems.

First, since the dummy pad formed on the substrate of the display panel to manually measure bonding resistance is exposed, static electricity may be introduced through the dummy pad. Static electricity may be introduced to a line or transistor for auto-probe inspection to damage the element.

Second, static electric may be charged through the dummy pad during an alignment film rubbing process and the charged static electricity is discharged to a neighbor signal line or transistor during a follow-up process to damage the element.

Third, a wearable device such as a smart watch or a dashboard of a vehicle has a narrow bezel, and thus, a space for disposing a dummy pad for resistance measurement is insufficient. Various forms of curved design are applied to display panels.

An aspect of the present disclosure provides a display device in which bonding resistance is automatically measured without having to dispose a separate dummy pad in a display panel, and a method for measuring contact resistance of a driving circuit thereof.

According to an aspect, a display device includes: a plurality of dummy bumps disposed on a driving circuit or a flexible circuit board; shorting pads disposed on the display panel to connect dummy pads; and a comparison circuit comparing an input voltage input through bonding resistance between the dummy bumps and the shorting pads with a variable reference voltage to measure the bonding resistance.

According to another aspect, a method for measuring contact resistance of a display device includes: connecting a plurality of dummy bumps disposed on a driving circuit or a flexible circuit board to shorting pads disposed on the display panel; and comparing an input voltage of a comparator input through bonding resistance between the dummy bumps and the shorting pads with a variable reference voltage to measure the bonding resistance.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Hereinafter, embodiments of the present disclosure will be described in detail with reference to the accompanying drawings. Like reference numerals refer to like elements throughout. In describing the present disclosure, if a detailed explanation for a related known function or construction is considered to unnecessarily divert the gist of the present disclosure, such explanation will be omitted but would be understood by those skilled in the art.

A display device of the present disclosure may be implemented as a liquid crystal display (LCD), a field emission display (FED), a plasma display panel (PDP), an organic light emitting display device, an electrophoresis display (EPD), and the like. In the following embodiment, an LCD device will be largely described as an example of a flat panel display, but the present disclosure is not limited thereto. For example, the present disclosure may be applied to any display device requiring auto-probe inspection.

Figure 2:
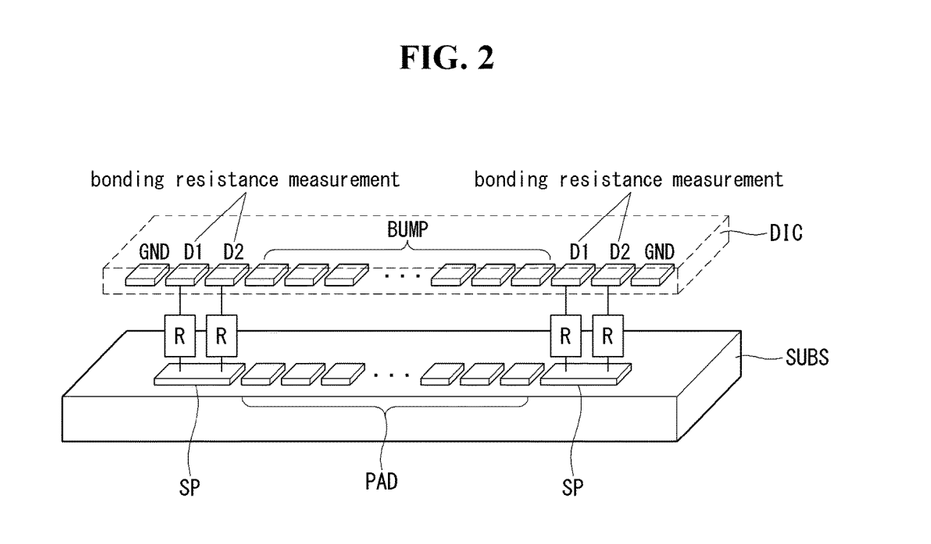
FIGS. 2 and 3 are views illustrating a circuit configuration for measuring contact resistance of the present disclosure.
Figure 3:
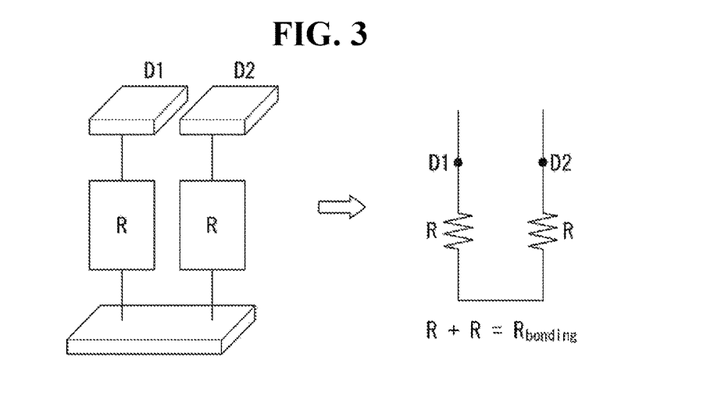

Referring to FIGS. 2 and 3, first and second dummy bumps (hereinafter, referred to as "dummy bumps") D1 and D2 for bonding resistance measurement are disposed at both ends of a drive IC DIC. Shorting pads SP electrically connected to the dummy bumps D1 and D2 through an ACF are disposed on a substrate SUBS of a display panel. One shorting pad SP shorts the first and second dummy bumps D1 and D2 to form a current path connecting the dummy bumps D1 and D2.

Signal bumps BUMP are disposed between left dummy bumps D1 and D2 and right dummy bumps D1 and D2 in the drive IC DIC. An output signal, e.g., a data signal, a scan signal, a driving voltage, a timing control signal, and the like, from the drive IC is output through the signal bumps BUMP. The signal bumps BUMP are electrically connected to signal pads PAD on the substrate SUBS through an ACF to supply the output signal from the drive IC DIC to a signal line of the display panel. The signal line may be a data line and/or a gate line of the display panel.

The dummy bumps D1 and D2 are bumps connected through the shorting pads SP on the substrate SUBS during a COG bonding process to measure bonding resistance $R_{bonding}$. As illustrated in FIGS. 2 and 3, the serially combined bonding resistance $R_{bonding}$=R+R, which is obtained by adding resistance R between the first dummy bump D1 and the shorting pad SP and resistance R between the second dummy bump D2 and the shorting pad SP. Since a plurality of dummy bumps are disposed in a chip package of the drive IC DIC for COG, there is no need to form a separate dummy bump in the chip package. In the present disclosure, in case of a chip package without dummy bumps, separate dummy bumps should be formed in the chip package.

In general, a bonding state between the drive IC DIC and the substrate SUBS is the best in a chip central portion of the drive IC DIC and becomes poor toward both ends of the drive IC DIC. Thus, since bonding resistance $R_{bonding}$ is largest at both ends of the drive IC DIC, if bonding resistance is measured as a good product level, it may be determined that a COG bonding process has been properly performed.

Figure 4:
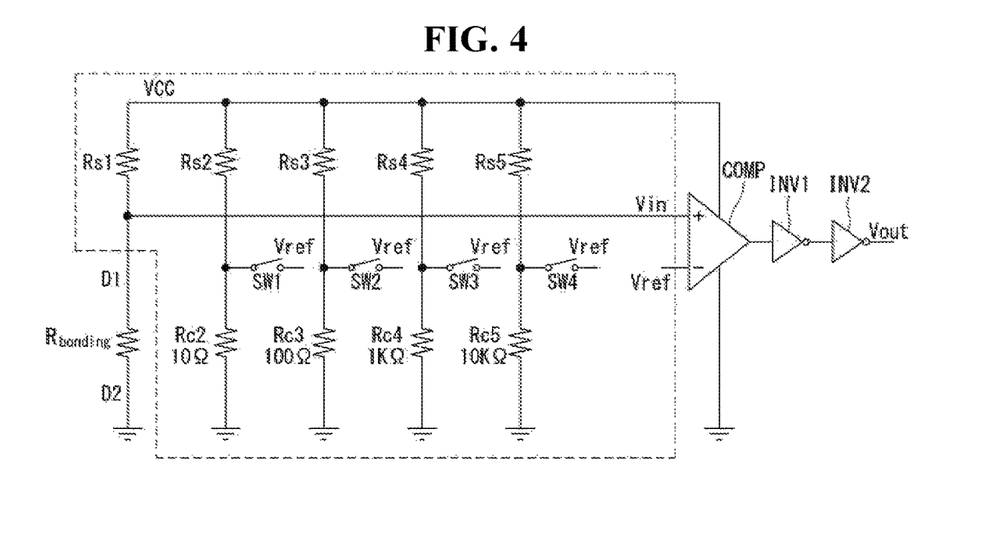
FIG. 4 is a circuit diagram illustrating a resistance measurement circuit according to an embodiment of the present disclosure.

In the present disclosure, bonding resistance is automatically measured without forming a dummy pad for resistance measurement on the substrate of the display panel. In particular, in the present disclosure, bonding resistance is not determined simply by any one of a good product level and a defective level, but is assorted by a preset resistance range by using such a circuit as illustrated in FIG. 4 to measure a resistance value. The circuit illustrated in FIG. 4 may be installed in the drive IC DIC. The resistance measurement circuit illustrated in FIG. 4 automatically measures bonding resistance $R_{bonding}$ by comparing an input voltage Vin input through bonding resistance between the dummy bumps D1 and D2 and the shorting pads SP with a variable reference voltage Vref. The circuit changes the variable reference voltage by changing a resistance value of a dividing circuit using a plurality of resistors and a plurality of switches.

Referring to FIG. 4, the resistance measurement circuit of the present disclosure includes a comparator COMP and a plurality of switches SW1 to SW4 for adjusting a reference voltage Vref of the comparator COMP. A plurality of resistors R1, Rs1 to Rs5 and Rc2 to Rc5 are connected to non-inverting terminal (+) of the comparator COMP. The comparator COMP, inverters INV1 and INV2, the resistors R1, Rs1 to Rs5, and Rc2 to Rc5 within the box indicated by the dotted line, and the switches SW1 to SW4 may be integrated within the drive IC DIC.

The comparator COMP includes an inverter input terminal (−) to which the reference voltage Vref is input, the non-inverting input terminal (+) to which an input voltage Vin is input, and an output terminal from which an output voltage Vout is output. The two inverters INV1 and INV2 may be connected in series to the output terminal of the comparator COMP.

The bonding resistance $R_{bonding}$ is connected to the first resistor Rs1. The first dummy bump D1 is connected to the first resistor Rs1, and the second dummy bump D2 is connected to a ground GND. The input voltage Vin of the comparator COMP is determined according to a resistance value of the dividing circuit including the first resistor Rs1 and the bonding resistance $R_{bonding}$. Vin is a node voltage between the first resistor Rs1 and the bonding resistance $R_{bonding}$ connected in series between a node VCC and GND.

In the present disclosure, the reference voltage Vref and the input voltage Vin are compared and a resistance value of the dividing circuit is adjusted on the basis of the reference voltage Vref to measure a resistance value of the bonding resistance $R_{bonding}$.

The comparator COMP outputs the source voltage VCC higher than a ground GND potential when the input voltage Vin is greater than the reference voltage Vref, and outputs a ground when the input voltage Vin is smaller than the reference voltage Vref. Thus, the output voltage Vout from the comparator COMP is determined as the VCC (or a high level) or as the GND (or a low level) according to the comparison result of Vin and Vref.

If Vin>Vref, Vout=VCC, If Vin<Vref, Vout=GND

Resistance values of the resistors Rs1 to Rs4 connected to the VCC node are set to be equal. For example, Rs1=Rs2=Rs3=Rs3=Rs4=10Ω.

The input voltage Vin is varied according to $R_{bonding}$ desired to be measured in the dividing circuit including the resistor Rs1 and $R_{bonding}$. The input voltage Vin is increased in portion to $R_{bonding}$ as follows.

$Vin=R_{bonding}/(Rs1+R_{bonding})*VCC$

If $R_{bonding}$=50Ω, VCC=1.8V, Vin=50/(10+50)*1.8V=1.5V

Since $R_{bonding}$ is not known, a resistance value of $R_{bonding}$ is estimated, while changing the reference voltage Vref compared with the input voltage Vin by sequentially changing modes of the switches SW1 to SW4.

Each of the switches SW1 to SW4 is connected between a node between two resistors of a dividing circuit and the inverting input terminal (−) of the comparator COMP and supplies the reference voltage Vref varied according to resistance of the dividing circuit to the comparator COMP.

When the first switch SW1 is turned on, the reference voltage Vref is determined as a resistance value of the dividing circuit including the Rs2 and Rc2. Here, the reference voltage Vref is a node voltage of Rs2=10Ω and Rc2=10Ω connected in series between the VCC node and GND.

In the case of first switch SW1 ON: Vref=10/(10+10)*1.8V=0.9V Vin(1.5V)>Vref(0.9V) Here, Vout=VCC (or high).

When the second switch SW2 is turned on, the reference voltage Vref is determined as a resistance value of the dividing circuit including Rs3 and Rc3. Here, the reference voltage Vref is a node voltage of Rs3=10Ω and Rc3=100Ω connected in series between the VCC node and GND.

In the case of SW2 ON: Vref=100/(10+100)*1.8V=1.64V Vin(1.5V)<Vref(1.64V) Here, Vout=GND (or low).

Figure 6:
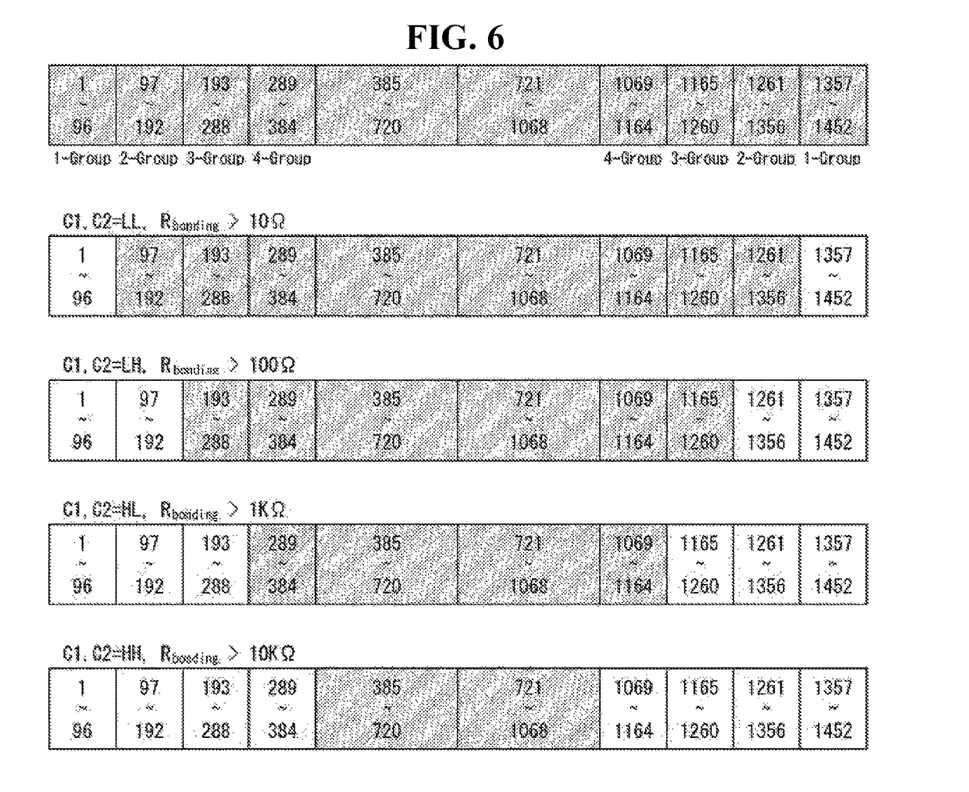
FIG. 6 is a view illustrating an example of a method for reporting measured bonding resistance.

In this case, when the switch SW1 is turned on, Vout is VC+C and when the switch SW2 is turned on, Vout is GND, and thus, it can be seen that $R_{bonding}$ is greater than 10Ω and smaller than 100Ω. Thus, since the resistance value of $R_{bonding}$ has been measured, the resistance measurement circuit of the present disclosure outputs the resistance value so that an inspector may know it, without having to additionally turn on the switches SW3 and SW4. Here, as an output method, the resistance value may be displayed as a numerical value and a symbol on a monitor, and may be displayed as a graphic image that can be known by intuition as illustrated in FIG. 6.

If the resistance value of $R_{bonding}$ cannot be known when the switches SW1 and SW2 are turned on, the switches SW3 and SW4 are sequentially turned on until the resistance value is known. When the switch SW3 is turned on, the reference voltage Vref is determined as a resistance value of the dividing circuit including Rs4 and Rc4. Here, the reference voltage Vref is a node voltage of Rs4=10Ω and Rc4=1 KΩ connected in series between the VCC node and GND. When the switch SW4 is turned on, the reference voltage Vref is determined as a resistance value of the dividing circuit including Rs5 and Rc5. Here, the reference voltage Vref is a node voltage of Rs5=10Ω and Rc5=10 KΩ connected in series between the VCC node and GND.

As for the output voltage Vout from the comparator COMP, when the comparator COMP is disposed at both ends of the drive IC DIC, a signal may be attenuated when the output voltage Vout is transmitted to a chip core positioned at a central portion of the IC chip. The inverters INV1 and INV2 prevent signal attenuation of the output voltage Vout to allow the measurement to be transmitted to the chip core. Two inverters INV1 and INV2 may not necessarily be connected and one or more inverters may be connected. If signal attenuation of the output voltage Vout is small, the inverters INV1 and INV2 may be omitted.

The aforementioned drive IC DIC includes at least a portion of a driving circuit of the display device. For example, the drive IC DIC may include one or two or more of a data driving circuit, a gate (or scan) driving circuit, a timing controller, and a touch sensor driving circuit.

The resistance measurement circuit of the present disclosure may control a bonding resistance measurement mode and measurement range using control data transmitted to the drive IC DIC.

Figure 5:
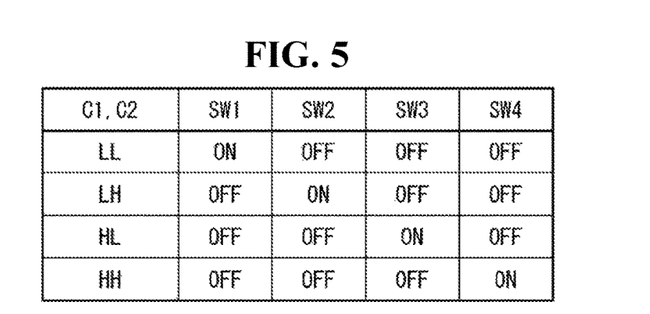
FIG. 5 is a view illustrating an example of control data for controlling a bonding resistance measurement mode and a measurement range.

FIG. 5 is a view illustrating an example of control data for controlling a bonding resistance measurement mode and a measurement range.

Referring to FIG. 5, the control data may include two or more bits. The example of FIG. 5 illustrates two bits (C1 and C2). When the measurement value range is subdivided, the number of bits may be increased. Switches SW1 and SW2 to be turned on may be selected according to a logic value of C1 and C2. In FIG. 5, L is an initial of low logic level (or 0 (zero)) and H is an initial of high logic level (or 1). They may also be expressed as L=0 and H=1.

A start packet of the control data may be allocated 2-bit code (TEST_B1/B2) indicating entry of the bonding resistance measurement mode. When the code (TEST_B1/B2) has a specific logic (e.g., "HH") during a specific period of time, the driver IC (DIC) enters the resistance measurement mode. The resistance measurement range may be selected according to set values of codes C1 and C2 previously set in a data start packet generated following control data. For example, C1, C2=LL (10Ω), LH (100Ω), HL (1 kΩ), HH (10 kΩ) as illustrated in FIG. 5, but the present disclosure is not limited thereto.

FIG. 6 is a view illustrating an example of a method for reporting measured bonding resistance. It should be appreciated that the method for reporting measured bonding resistance is not limited to FIG. 6.

Referring to FIG. 6, resistance values may be grouped to black blocks and white blocks and differentiated by color according to measured resistance ranges. The reporting method allows an inspector to know bonding resistance by intuition. When the number of output channels of the drive IC DIC is 1452, the output channels may be divided into four groups by 96 each. When the bonding resistance measurement mode enters, all the blocks are displayed in black color like the uppermost image. Resistance levels may be displayed by the number of white blocks according to resistance values of measured $R_{bonding}$ as follows.

10Ω and greater: Only the first block (1-Group, (1~96 Ch.)) is displayed in white color 100Ω and greater: Only first and second blocks (1~2 Group (1·192 Ch)) are displayed in white color 1 kΩ and greater: Only first to third blocks (1~3 Group (1~288 Ch)) are displayed in white color 10 kΩ and greater: First to four blocks (1~4 Group (1~384 Ch.)) are all displayed in white color Bonding resistance is measured through the dummy pads D1 and D2 disposed at both ends of the drive IC DIC, and since the measured bonding resistance value is a value measured at a position where contact resistance is the largest (worst), which may, thus, be considered as a representative contact resistance value of all the channels of the drive IC DIC. Thus, in the present disclosure, the measured bonding resistance values are displayed as contact resistance of all the channels in the drive IC on a screen of a monitor.

In the reporting method illustrated in FIG. 6, the drive IC DIC is virtually divided into a plurality of blocks and bonding resistance values are expressed by the number of blocks in different colors. The reporting method can be implemented using an internal circuit of the drive IC, and thus, it may be implemented without the burden of an additional circuit or without increasing a chip size. In the present disclosure, since a separate dummy pad is not provided on the substrate SUBS of the display panel to measure bonding resistance, static electricity introduced to the display panel through the dummy panel may be prevented. Also, in the present disclosure, since bonding resistance may be automatically measured in the display panel with a narrow bezel, the present disclosure may be applied to various forms of display panel structure.

A flexible circuit board such as an FPC, tape carrier package (TPC), a chip-on-film (COF), and the like, is also adhered to the substrate of the display panel through ACF. Contact resistance between bumps of the flexible circuit board and pads of the substrate may be measured using the resistance measurement circuit of FIG. 4. In this case, the resistance measurement circuit may be disposed on the flexible circuit board or the substrate SUBS of the display panel. Thus, the method for measuring contact resistance of the present disclosure may be applied to automatically measure contact resistance when flexible circuit boards having various structures come into contact with the display panel, as well as a driving circuit adhered to the display panel.

The applicant of the present disclosure proposed an embedded panel interface (EPI) for minimizing the number of lines between a timing controller and source drive ICs and stabilizing signal transmission in U.S. Pat. No. 8,330,699 B2 (Dec. 11, 2012), U.S. Pat. No. 7,898,518 B2 (Mar. 1, 2011), and U.S. Pat. No. 7,948,465 B2 (May 24, 2011), etc.

According to the EPI protocol, the source drive ICs feedback-input a lock signal LOCK having a high level indicating an output stable state to the timing controller when a phase and a frequency of an internal clock are fixed. The lock signal LOCK is feedback-input to the timing controller through a lock feedback signal line connected to the timing controller and a final source drive IC.

The timing controller transmits a clock training pattern signal to the source drive ICs before transmitting control data and video data of an input image. A clock restoring circuit of the source drive IC performs a clock training operation, while restoring clock by outputting an internal clock with respect to the clock training pattern signal, and when a phase and a frequency of the internal clock are stably fixed, the clock restoring circuit establishes a data link with the timing controller. In response to a lock signal received from a final source drive IC, the timing controller starts to transmit control data and video data to the source drive ICs.

The EPI protocol is extensively applied to various models. Recently, a method of further reducing the number of lines between the timing controller and the source drive ICs by connecting the timing controller and the source drive ICs in a multi-drop manner and transmitting data through an EPI protocol has been attempted. When the timing controller is connected to the source drive IC in a point-to-point manner, the timing controller should transmit a larger amount of data, and thus, a data transmission frequency of the EPI protocol is further increased, compared with the point-to-point connection scheme.

Figure 7A:
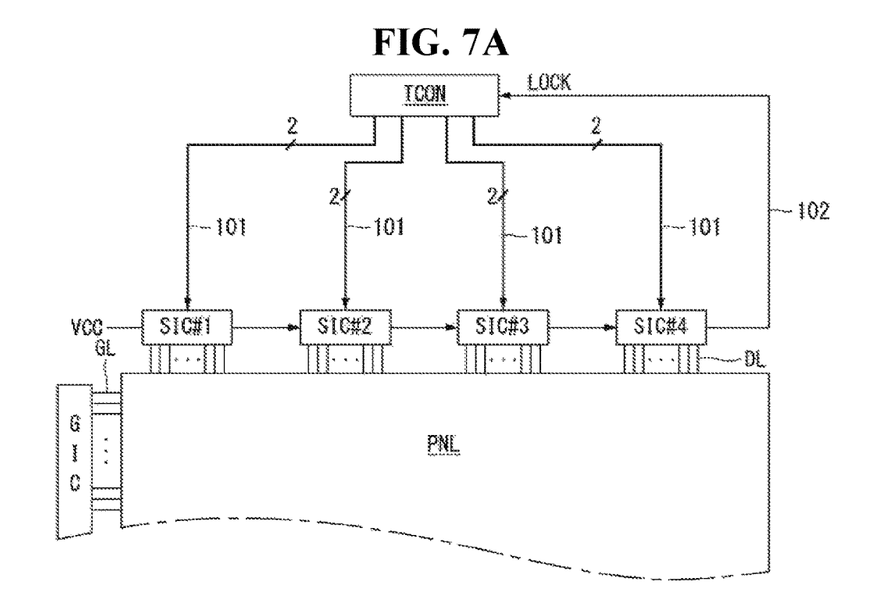
FIGS. 7A and 7B are views illustrating a display device to which an EPI interface is applied.
Figure 7B:
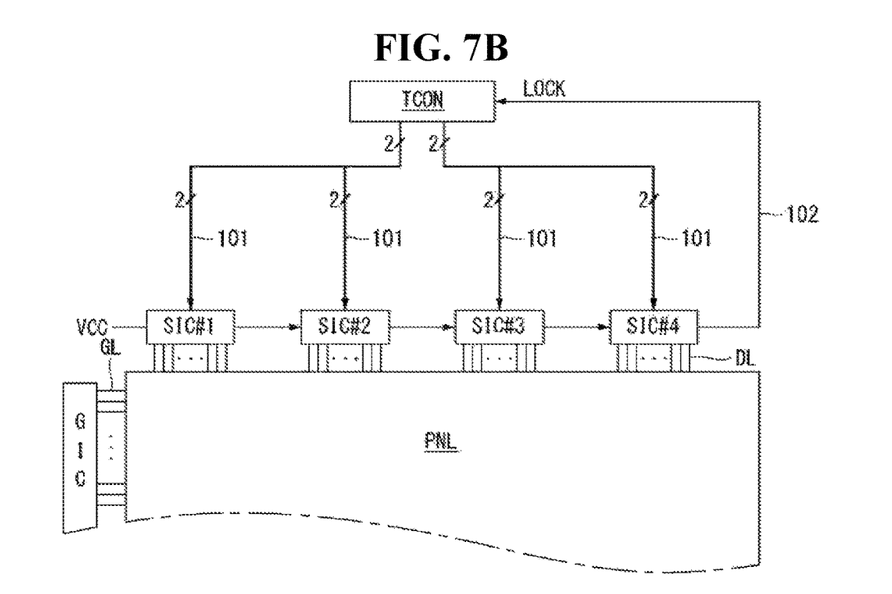

FIGS. 7A and 7B are views illustrating a display device to which an EPI interface is applied.

Referring to FIG. 7A, an LCD device according to an embodiment of the present disclosure includes a liquid crystal panel PNL, a timing controller TCON, one or more source drive ICs SIC#1 to SIC#4, and gate drive ICs GIC. A data driving circuit outputting a data voltage is integrated in the source drive ICs SIC#1 to SIC#4. A gate driving circuit outputting a gate pulse (or scan pulse) is integrated in the gate drive ICs GIC. The gate driving circuit may be directly formed on a substrate of the display panel together with a TFT array through a GIP process.

A liquid crystal layer is formed between substrates of the liquid crystal panel PNL. The liquid crystal panel PNL includes liquid crystal cells disposed in a matrix form by an intersection structure of data lines DL and gate lines GL.

A pixel array including the data lines DL, the gate lines GL, TFTs, storage capacitors, and the like, is formed on a TFT array substrate of the liquid crystal panel PNL. The liquid crystal cells are driven by an electric field between a pixel electrode to which a data voltage is supplied through the TFT and a common electrode to which a common voltage is supplied. A gate electrode of the TFT is connected to a gate line GL, and a drain electrode thereof is connected to a data line DL. A source electrode of the TFT is connected to a pixel electrode of a liquid crystal cell. The TFT is turned according to a gate pulse supplied through the gate line GL to supply a data voltage from the data line DL to the pixel electrode of the liquid crystal cell. A black matrix, a color filter, a common electrode, and the like, are formed on a color filter substrate of the liquid crystal panel PNL. A polarizer is attached to each of the TFT array substrate and the color filter array substrate of the liquid crystal panel PNL, and an alignment film for setting a pre-tilt angle of liquid crystal is formed. A space may be formed to cell gap of the liquid crystal cell Clc between the TFT array substrate and the color filter array substrate of the liquid crystal panel PNL.

The liquid crystal panel PNL may be implemented in a vertical field driving mode such as a twisted nematic (TN) mode and a vertical alignment (VA) mode or an in-plane field driving mode such as an in-plane switching (IPS) mode or fringe field switching (FFS) Mode. The LCD device of the present disclosure may be implemented in any of a transmissive LCD, a transflective LCD, and a reflective LCD. The transmissive LCD and the transflective LCD require a backlight unit. The backlight unit may be implemented as a direct type backlight unit or an edge type backlight unit.

In the liquid crystal panel PNL, a touch screen including touch sensors may be disposed. In this case, the display device of the present disclosure further includes a touch sensor driving circuit driving touch sensors.

The signal line pairs 2 are connected between the timing controller TCON and the source drive ICs SIC#1 to SIC#4 in a one-to-one manner to transmit a differential signal pair of EPIC data to the source drive ICs SIC#1 to SIC#4. A lock line 102 is connected between a final source drive IC SIC#4 and the timing controller TCON to transmit a lock signal to the timing controller TCON.

The timing controller TCON receives an external timing signal such as a vertical/horizontal synchronization signal Vsync/Hsync, an external data enable (DE) signal, a main clock (CLK), and the like from an external host system (not shown) through a low voltage differential signaling (LVDS) interface, a transition minimized differential signaling (TMDS) interface, and the like. The timing controller TCON converts a clock training pattern signal CT, a control data CTR, and pixel data RGB into differential signal pairs having a low voltage according to an EPI protocol and transmit the converted signal to the source drive ICs SIC#1 to SIC#4 through the signal line pairs 101. The clock training pattern signal CT, the control data CTR, and the pixel data RGB include an EPI clock.

When a phase and a frequency of an internal clock restored from the received EPI clock are fixed, a clock restoring circuit of each of the source drive ICs SIC#1 to SIC#4 generates a high level lock signal LOCK indicating a lock state. Meanwhile, when the phase and the frequency of the internal clock restored from the received EPI clock are not fixed but unstable (unlock), the clock restoring circuit of each of the source drive ICs SIC#1 to SIC#4 generates a low level lock signal LOCK indicating an unlock state. The lock signal is transmitted to a next source drive IC. The final source drive IC SIC#4 transmits a lock signal LOCK to the timing controller TCON through a lock line 102. A source voltage VCC is input to a lock signal input terminal of the first source drive IC.

When the lock signal LOCK has a low level, the timing controller TCON transmits a clock training pattern signal CT to the source drive ICs SIC#1 to SIC#4, and when the lock signal is inverted to have a high level, the timing controller TCON starts to transmit control data CTR and pixel data RGB of an input image.

An EPI clock is input to the clock restoring circuit of each of the source drive ICs SIC#1 to SIC#4. The clock restoring circuit generates (RGB bit number of video data×2) number of internal clocks by using a delay locked loop (DLL). Also, the DLL generates a lock signal LOCK. The clock restoring circuit may be implemented as a phase locked loop (PLL), instead of the DLL. The source drive ICs SIC#1 to SIC#4 sample video data bits of an input image according to an internal clock timing and subsequently converts sampled pixel data into parallel data.

The source drive ICs SIC#1 to SIC#4 decode control data CTR input through the signal line pairs 101 in a code mapping manner to restore source control data and gate control data. In response to the restored source control data, the source drive ICs SIC#1 to SIC#4 convert the video data of the input image into positive polarity/negative polarity analog video data voltage and supply the converted voltage to the data lines DL of the liquid crystal display panel PNL. The source drive ICs SIC#1 to SIC#4 may transmit the gate control data to one or more of gate drive ICs GIC.

In response to the gate control data directly received from the timing controller TCON or received through the source drive ICs SIC#1 to SIC#4, the gate drive IC GIC sequentially supplies a gate pulse synchronized with a positive polarity/negative polarity analog video data voltage to the gate lines GL.

As illustrated in FIG. 7B, the timing controller TCON may be connected to N (N is a positive integer of 2 or greater) number of source drive ICs through a single signal line pair 101 in a multi-drop manner to simultaneously transmit a differential signal pair of EPI data to N number of source drive ICs.

Figure 8:
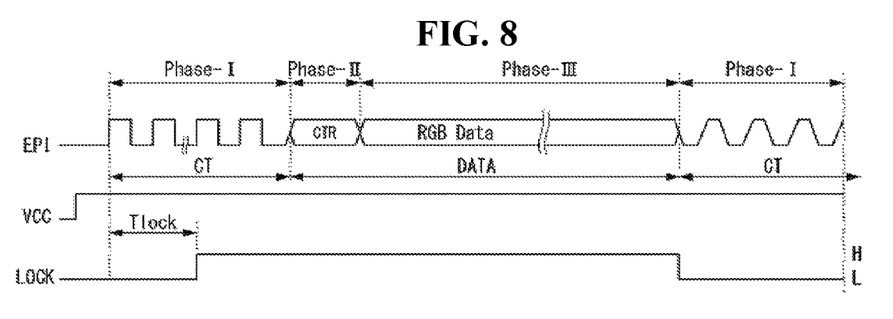
FIG. 8 is a waveform view illustrating an EPI protocol for transmitting EPI data between a timing controller (TCON) and source driver ICs (SIC#1 to SIC#4).
Figure 9:
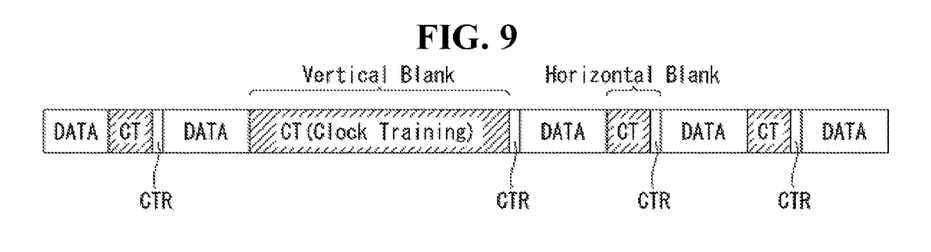
FIG. 9 is a view illustrating a bit stream of a clock training pattern signal, control data, and pixel data.

FIG. 8 is a waveform view illustrating an EPI protocol for transmitting EPI data between the timing controller (TCON) and the source driver ICs SIC#1 to SIC#4. FIG. 9 is a view illustrating a bit stream of a clock training pattern signal, control data, and pixel data.

Referring to FIGS. 8 and 9, the timing controller TCON transmits a clock training pattern signal CT having a predetermined frequency to the source driver ICs SIC#1 to SIC#4 during a first step (phase-I) period, and when a high level lock signal LOCK is input through the lock line 102, the timing controller TCON transitions to a second step (phase-II) signal transmission. During the second step (phase-II) period, the timing controller TCON transmits the control data CTR to the source driver ICs SIC#1 to SIC#4, and when the lock signal LOCK is maintained at a high level, the timing controller TCON transitions to a third step (phase-III) signal transmission to transmit pixel data (RGB data) of an input image to the source driver ICs SIC#1 to SIC#4.

In the second step (phase-II), the timing controller TCON may code a code defining entry of the bonding resistance measurement mode in a start packet of the control data. Also, in the third step (phase-III), the timing controller TCON may code it in a start packet of transmitted data. Thus, in the present disclosure, the resistance measurement mode and the measurement range may be automatically controlled using the proposed EPI protocol.

Figure 10:
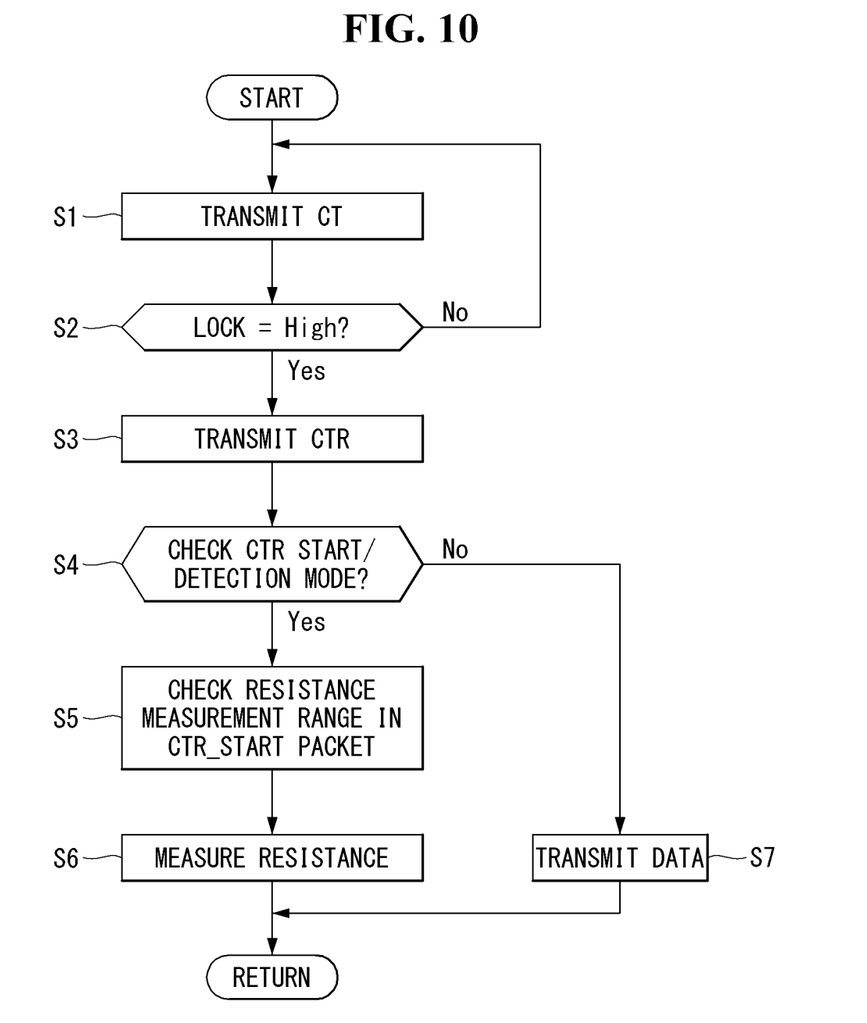
FIG. 10 is a flow chart illustrating a method for measuring contact resistance of a display device according to an embodiment of the present disclosure.

FIG. 10 is a flow chart illustrating a method for measuring contact resistance of a display device according to an embodiment of the present disclosure.

Referring to FIG. 10, during the first step (phase-I), the timing controller TCON transmits the clock training pattern signal CT to the source driver ICs SIC#1 to SIC#4, and when a lock state of DLL (LOCK=high) is input through the lock line 102, the timing controller TCON transitions to the second step (phase-II) signal transmission. During the second step (phase-II), the timing controller TCON may select entry of resistance measurement mode (S1 to S3). The source driver ICs SIC#1 to SIC#4 decodes a start packet of the control data to operate in the resistance measurement mode. (S4 to S6). The timing controller TCON does not code the code defining the resistance measurement mode in the control data and codes a normal operation code to control the source driver ICs SIC#1 to SIC#4 in the normal operation mode for displaying an input image (S7).

As mentioned above, it should be appreciated that the method for measuring contact resistance of the present disclosure is not applied only to the source driver ICs SIC#1 to SIC#4. For example, the present disclosure may be applied to a driving circuit or a flexible circuit board adhered to a substrate of a display panel through an ACF.

As mentioned above, in the present disclosure, bonding resistance between the driving circuit (or the flexible circuit board) and the display panel may be automatically measured without having to dispose a separate dummy pad on the substrate of the display panel.

In addition, in the present disclosure, rather than determining bonding resistance simply by any one of a good product level and a defective level, a resistance value thereof may be measured by differentiating the bonding resistance by a preset resistance range using the circuit illustrated in FIG. 4.

Furthermore, since the present disclosure is implemented using the internal circuit of the drive IC, it may be implemented without burdening an additional circuit or without increasing a chip size, and since a separate dummy pad is not provided on the substrate of the display panel, a problem of static electricity introduced to the display panel through the dummy panel may be prevented. Also, since bonding resistance is automatically measured in the display panel having a narrow bezel, the present disclosure may be applied to display panel structures of various shapes.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet. are incorporated herein by reference, in their entirety. Aspects of the embodiments can be modified, if necessary to employ concepts of the various patents, applications and publications to provide yet further embodiments.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device having a circuit connected thereto, the display device comprising:
 a plurality of dummy bumps disposed on the circuit;
 a display panel;
 shorting pads disposed on the display panel to connect dummy pads;
 a comparison circuit comparing an input voltage that is input through bonding resistance between the dummy bumps and the shorting pads with a variable reference voltage to provide a measure the bonding resistance between the circuit and the display panel, wherein the comparison circuit comprises: a comparator having a non-inverting input terminal to which the input voltage is input, an inverting input terminal to which the variable reference voltage is input, and an output terminal from which an output signal is output; a plurality of dividing circuits connected to the non-inverting terminal of the comparator; and a plurality of switches connected to the dividing circuits to select a resistance value of the dividing circuits, respectively; and
 a controller controlling entry of a measurement mode and a measurement range of the bonding resistance using a control signal for controlling the switches.

2. The display device of claim 1, wherein the comparison circuit changes the variable reference voltage by changing a resistance value of a dividing circuit using a plurality of resistors and a plurality of switches.

3. The display device of claim 1, wherein the comparison circuit further comprises one or more inverters connected to the output terminal of the comparator.

4. The display device of claim 3, wherein the comparison circuit comprises:
 a first switch connected between a first node between first and second resistors forming a first dividing circuit and the inverting input terminal of the comparator and supplying the variable reference voltage to the comparator; and
 a second switch connected between a first node between third and fourth resistors forming a second dividing circuit and the inverting input terminal of the comparator and supplying the variable reference voltage to the comparator,
 wherein the first and third resistors are connected to a source voltage node and have the same resistance value, and
 the second and fourth resistors are connected to a ground voltage node and have different resistance values.

5. The display device of claim 1, wherein the driving circuit and the flexible circuit board are divided into a plurality of blocks, and the bonding resistance value is expressed by the number of blocks in different colors.

6. The display device of claim 1 wherein the circuit is a driving circuit.

7. The display device of claim 6 wherein the driving circuit is on an integrated circuit and the dummy bumps are on the integrated circuit.

8. The display device of claim 1 wherein the circuit is on a flexible circuit board.

9. The display device of claim 1 wherein the display panel further includes a substrate.

10. The display device of claim 9 where the circuit is adhered to the substrate of the display panel by an anisotropic conductive film.

11. A method for measuring contact resistance of a display device having a driving circuit or a flexible circuit board adhered to a substrate of a display panel by an anisotropic conductive film (ACF), the method comprising:
 connecting a plurality of dummy bumps disposed on a driving circuit or a flexible circuit board to shorting pads disposed on the display panel;

comparing an input voltage of a comparator input through bonding resistance between the dummy bumps and the shorting pads with a variable reference voltage to measure the bonding resistance; and controlling entry of a measurement mode and a measurement range of the bonding resistance by controlling the switches for adjusting the variable reference voltage with a control signal.

12. The method of claim 11, further comprising:

dividing the driving circuit and the flexible circuit board into a plurality of blocks, and expressing the bonding resistance value by the number of blocks in different colors.

* * * * *